United States Patent [19]

Geijer et al.

[11] Patent Number: 4,470,804

[45] Date of Patent: Sep. 11, 1984

[54] SCRAP MATERIAL PREHEATING APPARATUS

[75] Inventors: Magnus Geijer; Artur Östlund, both of Linköping, Sweden

[73] Assignee: Asea AB, Västerås, Sweden

[21] Appl. No.: 445,231

[22] Filed: Nov. 29, 1982

[30] Foreign Application Priority Data

Dec. 1, 1981 [SE] Sweden .................. 8107163

[51] Int. Cl.³ .................. F27D 3/00; F27D 7/04; C21B 7/22
[52] U.S. Cl. .................. 432/9; 266/144; 266/901; 373/80; 432/199
[58] Field of Search .......... 373/80; 432/9, 199; 266/144, 901

[56] References Cited

U.S. PATENT DOCUMENTS

| | | | |
|---|---|---|---|
| 4,375,958 | 3/1983 | Date et al. | 373/80 |
| 4,385,889 | 5/1983 | Yasukawa | 373/80 |
| 4,395,280 | 7/1983 | Takenouchi et al. | 432/9 |

Primary Examiner—John J. Camby
Attorney, Agent, or Firm—Watson, Cole, Grindle & Watson

[57] ABSTRACT

Apparatus for preheating scrap material, e.g. scrap metal, comprises heaters, such as air preheaters, scrap containers and air or gas conduits for conveying heated gas from the heaters to the scrap container(s) and back from the scrap container(s). The apparatus is characterized in that the conduit to the scrap container(s) is provided with valve means for diverting the flow of hot air or gas to the container(s), for example during replacement of container(s).

8 Claims, 2 Drawing Figures

SCRAP MATERIAL PREHEATING APPARATUS

BACKGROUND OF THE INVENTION

1. Field of the Invention

This invention relates to scrap metal preheating apparatus of the kind comprising gas heating means, such as air preheaters, containers for scrap metal, and conduit means for conducting heated gas from the gas heating means to the scrap metal containers.

2. Description of the Prior Art.

Scrap metal preheating apparatus of the kind referred to is disclosed in German Offenlegungsschrift No. 3205269. The purpose of such scrap preheating apparatus is to preheat scrap metal or other charge prior to charging in a furnace, such as an arc furnace or an induction furnace, to increase production in the furnace and save energy. Another reason for the preheating is to prevent water or ice from accompanying the charge into the furnace with the ensuing risk of explosion.

SUMMARY OF THE INVENTION

According to the present invention scrap material preheating apparatus comprises gas heating means, at least one scrap material preheating station, containers for scrap material, movable container support means for moving ones of said containers supported thereby into and out of said preheating stations(s), gas conveying means comprising conduit means for conveying gas heated in the gas heating means through the container(s) positioned in said preheating station(s), and valve means in said conduit means operable to divert the flow of heated gas flowing from the gas heating means to the scrap material preheating station(s).

Preferably the container support means comprises rotatable platform means. In this case the platform means is repeatedly turnably indexed through a given angle to advance containers supported on the platform means from a loading station, into and out of the preheating station(s) to an unloading station (which may be the same station as the loading station). The valve means is suitably operated to divert flow of heated gas to the preheating station(s) during indexing movements of the platform means.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
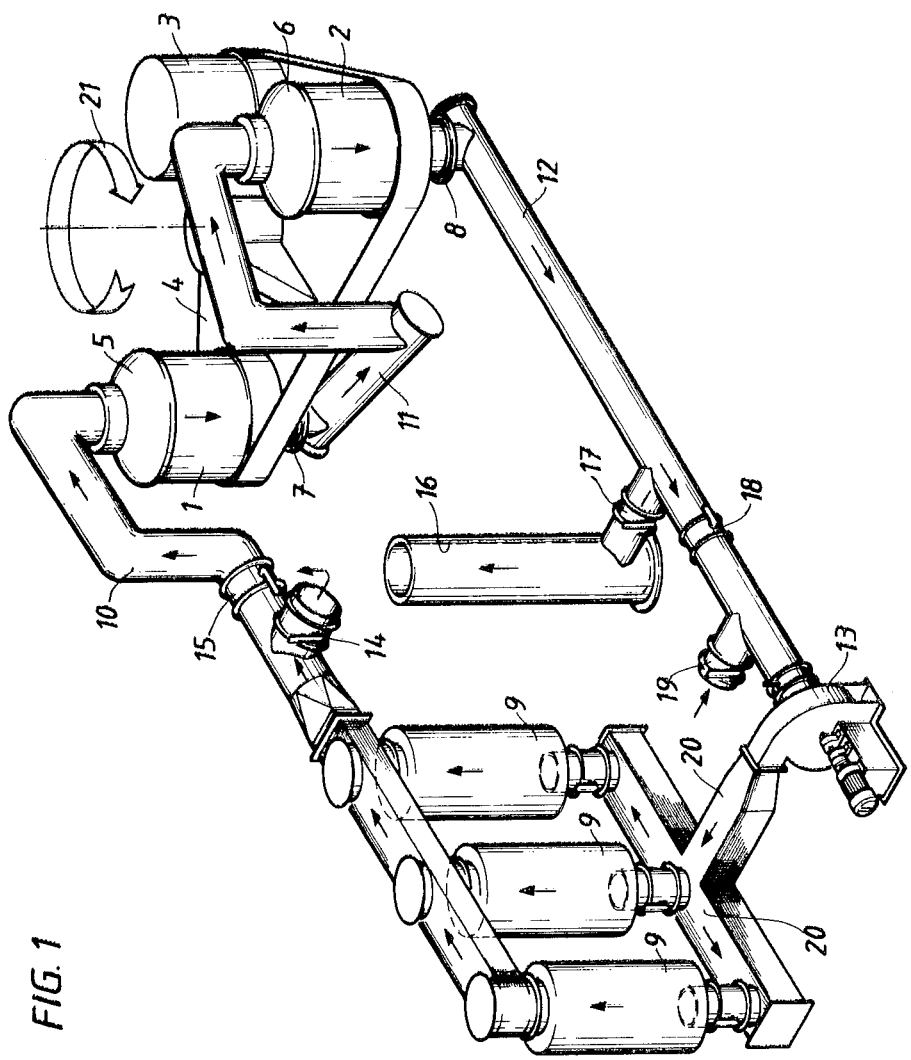
FIG. 1 is a schematic view of one embodiment of scrap metal preheating apparatus according to the invention.

FIG. 1 shows one embodiment of apparatus according to the invention intended to preheat scrap metal for steel furnaces and comprising at least one gas or air preheater 9 (three such air preheaters 9 are shown in FIG. 1), a rotatable platform 4 on which are supported a number of bucket-like scrap containers 1, 2, 3 and gas conveying means (10–20) for conveying heated gas to and from containers 1 and 2.

In FIG. 1 the scrap containers 1 and 2 are positioned in preheating stations and the container 3 is free for handling in a loading/unloading station. In this position air is circulated by means of a fan device 13. The air passes via channels 20 into air preheaters 9. After heating therein, the heated air is passed via a conduit 10 to the first scrap container 1 positioned in the preheating station and there transmits part of its heat content to scrap metal which had previously been charged into the scrap container 1. After passage through the scrap container 1, the air is passed via another conduit 11 to the second scrap container 2 positioned in the other preheating station and preheats the scrap therein. Thereafter the air is returned to the air preheaters 9 via the conduit 12 and the fan device 13.

The containers 1 and 2, when in the preheating stations, have lids 5 and 6, respectively, and bottom connections 7 and 8, respectively, associated therewith. The lids 5 and 6 are slidable upwardly and downwardly on downwardly depending end portions of the conduits 10 and 11, respectively, between upper, open positions and lower, closed positions. Furthermore the bottom connections 7 and 8 are connectable to, and disconnectible from, the bottoms, or means in communication with the bottoms, of the containers 1 and 2, respectively. In FIG. 1, the lids 5 and 6 are shown in their lower, closed positions fitted to close the open tops of the containers 1 and 2, respectively, and the bottom connections 7 and 8 are shown connected so as to be in communication with the bottoms of the containers 1 and 2, respectively. Thus the containers 1 and 2 are connected in series into the conduit system provided by the conduits 10, 11 and 12 to enable the passage of gas, heated in the air preheaters 9, through the containers 1 and 2 and consequently through scrap metal contained in these containers. In order to disconnect the containers 1 and 2 from the conduits 10, 11 and 12, the lids 5, 6 are moved into their upper, open positions so as to be clear of the open tops of the containers 1, 2 and the bottom connections 7, 8 are disconnected. The platform 4 is then free to rotate about a vertical turning axis, in the direction indicated by arrow 21, without the conduits 10–12, the lids 5,6 and the bottom connections 7,8 interfering with the movement of the platform 4 and the containers supported thereon.

In FIG. 1 the gas heated by the preheaters 9 is conveyed through the containers 1 and 2, giving up some of its heat to the scrap metal contained therein. When the scrap metal in the containers 1 reaches its maximum temperature, a valve 14 to a chimney (not shown in FIG. 1 but similar to chimney 16) is opened and a valve 15 is closed. With the valves 14, 15 so positioned, the lids 5, 6 are raised into their upper open positions and the bottom connections 7, 8 are disconnected without the need for the air preheaters 9 having to be shut off. The rotatable platform 4 is then turnably indexed through 120° in the direction indicated by arrow 21. The scrap container 1 is thus moved into the loading/unloading station for unloading from the platform 4 and subsequent replacement by another container (not shown) charged with scrap material to be preheated. The container 3 is moved from the loading/unloading station into the initial preheating station (i.e. the station occupied by container 2 in FIG. 1) and the container 2 is moved from the initial preheating station to the final preheating station (i.e. the station occupied by container 1 in FIG. 1). With the containers in their new positions, the lids 5, 6 are moved into their closed position on, and the bottom connections are connected to, the containers 2 and 3, respectively. The valve 15 is then opened and the valve 14 is closed causing the flow of heated gas to once again flow along conduit 10 and through the containers 2 and 3 positioned in the two preheating stations.

It will thus be appreciated that in the apparatus described by repeatedly indexing the platform 4 through 120° in the direction 21, containers containing scrap which are loaded onto the platform 4 at the loading/unloading station are successively moved into and out of each preheating station before being returned to the loading/unloading station for unloading. When there is no container positioned in each preheating station, e.g. during indexing movement of the platform 4, the flow of heated gas to the preheating stations is prevented by opening valve 14 and closing valve 15. The apparatus thus allows a succession of containers containing scrap material to have their contents preheated without the need for continually closing down and restarting the operation of the preheaters 9.

The valves 17-19 are provided in conduit 12 to enable the apparatus to run without recirculating the heated air/gas, which may be desirable if the scrap material contains large quantities of dust or combustible impurities. For example by closing valve 18 and opening valves 17 and 19, heated gas, after passage through the preheating stations, is diverted from conduit 12 to the chimney 16, and fresh air to be preheated is drawn into conduit 12 through the open valve 19. Alternatively gas is circulated by closing valve 17 and opening valve 18.

Figure 2:
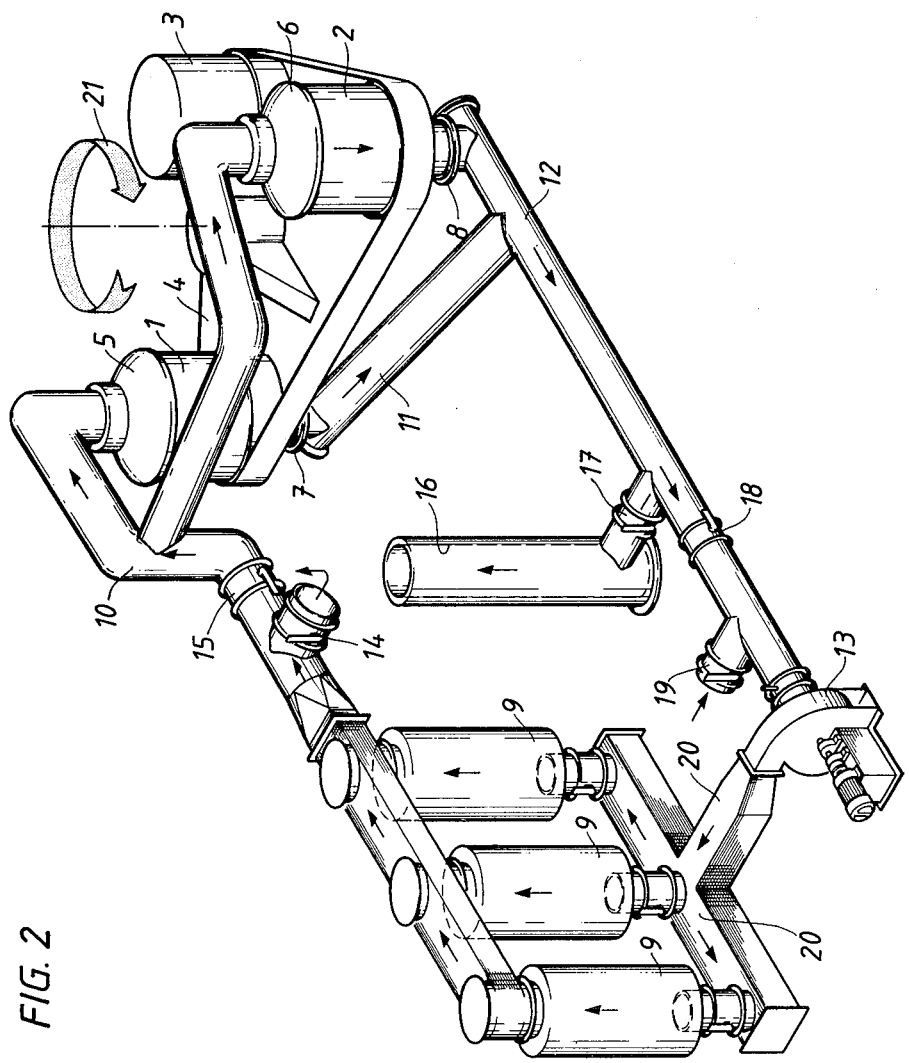
FIG. 2 is a schematic view of an alternative method of connecting conduits for the supply of heated gas to containers positioned at preheating stations in another embodiment of scrap metal preheating apparatus according to the invention.

FIG. 2 shows another embodiment of scrap material preheating apparatus according to the invention. The apparatus shown in FIG. 2 is similar in many respects to the apparatus shown in FIG. 1 (where possible similar parts of the two apparatuses have been designated with the same reference numerals), the only difference being in the manner in which the containers 1 and 2 are connected in the preheating stations. Whereas in the apparatus shown in FIG. 1 the conduits 10-12 are arranged to pass heated gas in series through the containers 1 and 2 in the preheating stations, in the apparatus shown in FIG. 2 the conduits 10-12 are arranged to pass heated gas in parallel through the containers 1 and 2 in the preheating stations.

The apparatus described with respect to FIG. 1 or 2 may be modified in many ways. For example although two preheating stations are shown in the apparatuses described, any number (including one) of preheating stations could alternatively be provided. Furthermore instead of providing a single loading/unloading station for the containers, a separate container loading station and a separate container unloading station may be provided. Of course the number of "stations" provided will influence the angle through which the platform 4 is indexed. In general if there are n "stations" (i.e. preheating, loading and/or unloading stations), where n is an integer greater than 1, the platform will be required to be repeatedly indexed through angles of 360°/n.

It should also be appreciated that the platform 4 can also be designed in a different manner without departing from the principle of the invention. Indeed although not a preferred design it is even possible to provide linearly movable container support means instead of the rotatable platform 4.

The invention can be varied in many ways within the scope of the following claims.

What is claimed is:

1. Scrap material preheating apparatus comprising:
   (a) gas preheating means;
   (b) at least one scrap material preheating station;
   (c) containers for scrap material;
   (d) movable container support means comprising rotatably indexed platform means for indexing movement of containers supported thereon into and out of said preheating station;
   (e) gas conveying means comprising conduit means for conveying gas heated in the gas preheating means through the container(s) positioned in said preheating station;
   (f) valve means in said conduit means operable to divert the flow of heated gas flowing from the gas preheating means to the scrap material preheating station; and
   (g) said valve means including valves provided in the conduit means for diverting the flow of heated gas away from the scrap material preheating station.

2. Apparatus according to claim 1, including at least one loading and/or unloading station into and out of which containers supported on the movable container support means are moved for loading the containers with scrap material prior to being heated in the preheating station and/or for unloading the containers with scrap material after being heated in the preheating station.

3. Apparatus according to claim 1, in which said conduit means is connected to enable heated gas which has passed through the container(s) positioned in said preheating station(s) to be conveyed back to said gas heating means.

4. Apparatus according to claim 3, in which a further valve means is provided in the conduit means for diverting the flow of heated gas from the scrap material preheating station(s) to the gas heating means.

5. Apparatus according to claim 1, wherein there are at least two scrap material preheating stations, the conduit means comprising first inlet and outlet conduits connected with the container at one of said stations, and second inlet and outlet conduits connected with the container at the other of said stations, said first outlet conduit and said second inlet conduit being interconnected so that heated gas is passed in series through the preheating stations.

6. Apparatus according to claim 1, wherein there are at least two scrap material preheating stations, the conduit means comprising first inlet and outlet conduits connected with the container at one of said stations, and second inlet and outlet conduits connected with the container at the other of said stations, said first and second inlet conduits being interconnected so that heated gas is passed in parallel through the preheating stations.

7. A method of preheating scrap material comprising repeatedly indexing a support means; between indexing movements of the support means loading onto the support means containers containing scrap material to be preheated for subsequent indexing movement into and out of at least one preheating station, unloading containers which have been indexed through the or each preheating station and which contain preheated scrap material, and supplying heated gas to the or each preheating station for preheating scrap material contained in containers supported by the support means at the or each preheating station; and diverting the flow of heated gas to the or each preheating station during indexing movements of the support means.

8. A method according to claim 7, wherein the support means is rotatably mounted and moves through a single revolution in n indexing movements, where n is an integer greater than 1.

* * * * *